United States Patent
Hashemzadeh et al.

(10) Patent No.: US 6,414,087 B1
(45) Date of Patent: Jul. 2, 2002

(54) PROCESS FOR PREPARING AN AQUEOUS POLYMER DISPERSION FOR REDETACHABLE PRESSURE SENSITIVE ADHESIVE FILMS

(75) Inventors: Abdulmajid Hashemzadeh, Burgkirchen; Mihai Gurau; Rudolf Weissgerber, both of Burghausen; Walter Dobler, Tann, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/520,733

(22) Filed: Mar. 8, 2000

(30) Foreign Application Priority Data

Mar. 18, 1999 (DE) .......................................... 199 12 253

(51) Int. Cl.⁷ ................................................ C08F 8/00
(52) U.S. Cl. ...................................................... 525/191
(58) Field of Search ................................ 524/730, 731, 524/732, 560; 526/75, 317, 321, 324; 428/355, 500

(56) References Cited

U.S. PATENT DOCUMENTS

| | | | |
|---|---|---|---|
| 2,884,126 A | | 4/1959 | Ulrich |
| 4,181,752 A | | 1/1980 | Martens et al. |
| 4,599,265 A | | 7/1986 | Esmay |
| 4,833,179 A | | 5/1989 | Young et al. |
| 4,925,908 A | * | 5/1990 | Bernard et al. ............. 526/320 |
| 5,502,089 A | * | 3/1996 | Bricker et al. ................ 524/44 |
| 5,558,913 A | * | 9/1996 | Sasaki et al. ............. 428/41.5 |
| 5,925,432 A | * | 7/1999 | Kian et al. ................. 428/40.1 |
| 6,147,165 A | * | 11/2000 | Lee et al. ................ 525/330.2 |

FOREIGN PATENT DOCUMENTS

| | | |
|---|---|---|
| DE | 33 46 100 A1 | 7/1985 |
| DE | 41 33 193 A1 | 4/1993 |
| DE | 38 89 339 T2 | 3/1995 |
| DE | 196 49 383 A1 | 6/1998 |
| DE | 197 33 133 A1 | 2/1999 |
| EP | 0 224 795 | 6/1987 |
| EP | 0 224 795 | 2/1990 |
| EP | 0 287 306 | 1/1993 |
| EP | 0 736 585 | 10/1996 |
| WO | 90 06 976 | 6/1990 |
| WO | 95 04 763 | 2/1995 |

OTHER PUBLICATIONS

Derwent Abstract Corresponding To DE 33 46 100 A1 [AN 1985—165784].
Derwent Abstract Corresponding To DE 41 33 193 A1 [AN 1993—118483].
Derwent Abstract Corresponding To DE 38 89 339 T2 [AN 1990—224515].
Derwent Abstract Corresponding To DE 196 49 383 A1 [AN 1998—313410].
Derwent Abstract Corresponding To DE 197 33 133 A1 [AN 1999—108373].

* cited by examiner

Primary Examiner—Nathan M. Nutter
(74) Attorney, Agent, or Firm—Brooks & Kushman P.C.

(57) ABSTRACT

The invention relates to a process for preparing an aqueous polymer dispersion for removable pressure-sensitive adhesive films by means of free-radically initiated aqueous emulsion polymerization of one or more ethylenically unsaturated monomers from the group consisting of esters of acrylic acid and methacrylic acid with branched or unbranched alcohols having 1 to 12 carbon atoms, vinyl esters of branched or unbranched carboxylic acids having 1 to 12 carbon atoms, vinyl-aromatics, vinyl halides, olefins and dienes, which comprises copolymerizing from 0.01 to 2.0% by weight of polar, ionic or nonionic comonomers or mixtures thereof, and if polar ionic comonomers, alone or in a mixture, are copolymerized, the proportion thereof is not more than 1.0% by weight, and the amounts in % by weight are based in each case on the overall weight of the comonomers.

20 Claims, No Drawings

PROCESS FOR PREPARING AN AQUEOUS POLYMER DISPERSION FOR REDETACHABLE PRESSURE SENSITIVE ADHESIVE FILMS

FIELD OF THE INVENTION

The invention relates to a process for preparing an aqueous polymer dispersion for removable pressure-sensitive adhesive films by means of free-radically initiated aqueous emulsion polymerization.

BACKGROUND OF THE INVENTION

Pressure-sensitive adhesives based on aqueous polymer dispersions have been known for a long time. Examples of pressure-sensitively adhering articles which can be prepared using them are labels and adhesive tapes. For example, U.S. Pat. No. 2,884,126 discloses acrylate-based pressure-sensitive adhesives containing 3 to 12% of polar comonomers. U.S. Pat. No. 4,181,752 describes UV-crosslinked, acrylate-based pressure-sensitive adhesives containing from 2 to 30% of polar comonomers. In the fields of use referred to it is desirable for the adhesive film to be detachable from the substrate, as far as possible without residue, even after a prolonged period. A problem in this respect is that the peel strength of conventional pressure-sensitive adhesive compositions, as are often used to produce labels or adhesive tapes, normally increases so greatly over time that they cannot be separated easily from the substrate. When separation takes place, the backings are torn off and/or large portions of the adhesive composition (adhesive film) remain adhering to the substrate. This problem is particularly prevalent in the case of systems of large surface area; for example, when carpets are bonded using carpet laying tapes. The adhering adhesive composition on the floor or parquet must then be removed by laborious cleaning with organic solvents.

U.S. Pat. No. 4,599,265 describes removable pressure-sensitive adhesives based on acrylate with up to 3% of polar comonomers whose redetachability is ensured by means of UV crosslinking. EP-A 224795 reports on earlier attempts in the prior art to improve the redetachability by adding plasticizer to the pressure-sensitive adhesive or by copolymerizing crosslinkable comonomers. For improving the redetachability it is recommended to copolymerize silane-functional comonomers. The document explicitly advises against copolymerizing polar monomers in removable pressure-sensitive adhesive compositions. For the preparation of removable pressure-sensitive adhesives, EP-B 287306 uses phosphate emulsifiers and copolymerizable emulsifiers. EP-A 736585 likewise advises against copolymerizing polar comonomers in pressure-sensitive adhesives for removable pressure-sensitive adhesive films. Copolymer compositions are recommended which are obtained by polymerizing a precursor mixture comprising acrylate monomers, without polar comonomers, and also hydrophobic silica and crosslinkers.

The object of this invention was to provide an aqueous dispersion system for use with a very wide variety of pressure-sensitively adhering articles in the label and adhesive tape sectors which possesses high cohesion and whose peel strength does not increase greatly after aging or prolonged bonding periods, so that the articles can be detached again virtually without residue.

BRIEF DESCRIPTION OF THE INVENTION

The invention provides a process for preparing an aqueous polymer dispersion for removable pressure-sensitive adhesive films by means of free-radically initiated aqueous emulsion polymerization of one or more ethylenically unsaturated monomers from the group consisting of esters of acrylic acid and methacrylic acid with branched or unbranched alcohols having 1 to 12 carbon atoms, vinyl esters of branched or unbranched carboxylic acids having 1 to 12 carbon atoms, vinyl-aromatics, vinyl halides, olefins and dienes, which comprises copolymerizing from 0.01 to 2.0% by weight of polar, ionic or nonionic comonomers or mixtures thereof, and if polar ionic comonomers, alone or in a mixture, are copolymerized, the proportion thereof is not more than 1.0% by weight, and the amounts in % by weight are based in each case on the overall weight of the comonomers.

DETAILED DESCRIPTION OF THE INVENTION

Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, and 2-ethylhexyl acrylate. Particular preference is given to methyl acrylate, methyl methacrylate, ethyl acrylate, n-butyl acrylate and 2-ethylhexyl acrylate.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, an example being VeoVa9$^R$ or VeoVa10$^R$ (tradenames of Shell). Vinyl acetate is particularly preferred. Preferred vinylaromatics are styrene, methylstyrene and vinyltoluene. A preferred vinyl halide is vinyl chloride. The preferred olefins are ethylene and propylene and the preferred dienes are 1,3-butadiene and isoprene.

Particular preference is given to comonomer compositions in which the proportion of the esters of acrylic acid and methacrylic acid with branched or unbranched alcohols having 1 to 12 carbon atoms is $\geq 50\%$ by weight. Most-preferred comonomer mixtures containing the specified proportions of polar ionic and nonionic comonomers are those including ethyl acrylate or n-butyl acrylate or $^2$-ethylhexyl acrylate, or mixtures of methyl methacrylate with n-butyl acrylate and/or 2-ethylhexyl acrylate, or mixtures of methyl methacrylate with n-butyl acrylate and/or ethyl acrylate, or mixtures of methyl methacrylate with 1,3-butadiene, or mixtures of styrene with ethyl acrylate and/or n-butyl acrylate, or mixtures of acrylic esters such as ethyl acrylate, n-butyl acrylate, 2-ethylhexyl acrylate with vinyl esters such as vinyl acetate and/or vinyl esters of α-branched monocarboxylic acids having 9 to 11 carbon atoms and, if desired, ethylene.

In general, the monomers and, if appropriate, the weight fractions of the comonomers are selected so as to give a glass transition temperature Tg of the polymers of from −60° C. to 0° C. The glass transition temperature Tg of the polymers can be determined in a known manner by means of differential scanning calorimetry (DSC). The Tg can also be calculated approximately in advance by means of the Fox equation. According to Fox T. G., Bull. Am. Physics Soc. 1, 3, page 123 (1956) the following is true: $1/Tg = x_1/Tg_1 + x_2/Tg_2 + \ldots + x_n/Tg_n$, where $x_n$ represents the mass fraction (% by weight/100) of the monomer n and $Tg_n$ is the glass transition temperature, in Kelvin Degrees, of the homopolymer of the monomer n. Tg values for homo-polymers are listed in Polymer Handboook, $2^{nd}$ Edition, J. Wiley & Sons, New York (1975).

Suitable polar ionic comonomers are ethylenically unsaturated mono- and dicarboxylic acids, preferably acrylic acid, methacrylic acid, itaconic acid, fumaric acid and maleic acid, and also ethylenically unsaturated sulfonic acids, preferably vinylsulfonic acid and 2-acrylamido-2-methylpropanesulfonic acid. Ionic comonomers are those which, like the carboxylic acid group or sulfonic acid group, can be present in ionic form under certain pH conditions. Suitable polar nonionic comonomers are ethylenically unsaturated carboxamides and carbonitriles, preferably acrylamide and acrylonitrile, and also methacrylic and acrylic acid hydroxyalkyl esters with a $C_1$ to $C_8$ alkyl radical, preferably hydroxyethyl, hydroxypropyl or hydroxybutyl acrylate or methacrylate. Acrylic acid and methacrylic acid are the most preferred polar ionic comonomers. The most preferred polar nonionic comonomers are acrylamide, methacrylamide and hydroxyethyl acrylate, hydroxypropyl acrylate and hydroxybutyl acrylate. The proportion of said polar ionic comonomers is preferably from 0.2 to 0.99% by weight. The proportion of said polar nonionic comonomers is preferably from 0.5 to 2.0% by weight, the proportions in % by weight being based in each case on the overall weight of the comonomers.

In the case of preparation in accordance with the emulsion polymerization process the polymerization temperature is generally from 40° C. to 100° C., preferably from 60° C. to 90° C. In the case of the copolymerization of gaseous comonomers such as ethylene, 1,3-butadiene or vinyl chloride it is also possible to operate under pressure, generally between 5 bar and 100 bar.

The polymerization is initiated using the initiators or redox initiator combinations commonly used for emulsion polymerization. Examples of suitable organic initiators are hydroperoxides such as tert-butyl hydroperoxide, tert-butyl peroxopivalate, cumene hydroperoxide, isopropylbenzene monohydroperoxide or azo compounds such as azobisisobutyronitrile. Suitable inorganic initiators are the sodium, potassium and ammonium salts of peroxodisulfuric acid. These initiators are generally used in an amount of from 0.05 to 3% by weight, based on the overall weight of the monomers.

Redox initiators used are combinations of the abovementioned initiators with reducing agents. Suitable reducing agents are the sulfites and bisulfites of the alkali metals and of ammonium, an example being sodium sulfite, the derivatives of sulfoxylic acid, such as zinc or alkali metal formaldehyde-sulfoxylates, an example being sodium hydroxymethanesulfinate, and ascorbic acid. The amount of reducing agent is preferably from 0.01 to 5.0% by weight, based on the overall weight of the monomers.

In order to control the molecular weight it is possible to use regulators during the polymerization. They are used commonly in amounts of from 0.01 to 5.0% by weight, based on the monomers to be polymerized, and are metered in separately or else as a premix with reaction components. Examples of such regulators are n-dodecyl mercaptan, tert-dodecyl mercaptan, mercapto-propionic acid, methyl mercaptopropionate, isopropanol, and acetaldehyde.

The polymerization mixture is stabilized by means of emulsifiers and/or protective colloids. Stabilization is preferably effected by means of emulsifiers, in order to obtain a low dispersion viscosity. The overall amount of emulsifier is preferably from 0.1 to 5% by weight, in particular from 0.5 to 3% by weight, based on the overall weight of the comonomers. Suitable emulsifiers are anionic or nonionic emulsifiers or mixtures thereof, examples being:

1) alkyl sulfates, especially those having a chain length of 8 to 18 carbon atoms, alkyl and alkylaryl ether sulfates having 8 to 18 carbon atoms in the hydrophobic radical and from 1 to 50 ethylene oxide units;
2) sulfonates, especially alkylsulfonates having 8 to 18 carbon atoms, alkylarylsulfonates having 8 to 18 carbon atoms, diesters and monoesters of sulfosuccinic acid with monofunctional alcohols or alkylphenols having 4 to 15 carbon atoms in the alkyl radical; if desired, these alcohols or alkylphenols can also be ethoxylated with from 1 to 40 ethylene oxide units;
3) phosphoric acid partial esters and their alkali metal and ammonium salts, especially alkyl and alkylaryl phosphates having 8 to 20 carbon atoms in the organic radical, alkyl ether and alkylaryl ether phosphates having 8 to 20 carbon atoms in the alkyl and alkylaryl radical and from 1 to 50 EO units;
4) alkyl polyglycol ethers, preferably having from 8 to 40 EO units and alkyl radicals having 8 to 20 carbon atoms;
5) alkylaryl polyglycol ethers, preferably having from 8 to 40 EO units and 8 to 20 carbon atoms in the alkyl and lryl radicals;
6) ethylene oxide/propylene oxide (EO/PO) block copolymers, preferably having from 8 to 40 EO and PO units.

It is preferred to use mixtures of anionic emulsifier and nonionic emulsifier. Particular preference is given to mixtures of a diester or monoester of sulfosuccinic acid with monofunctional alcohols or alkylphenols having 4 to 15 carbon atoms in the alkyl radical, as anionic emulsifier, and as nonionic emulsifier an alkyl polyglycol ether preferably having from 8 to 40 EO units and alkyl radicals having 8 to 20 carbon atoms, in a weight ratio of from 8:1 to 1:8.

If desired, the emulsifiers can also be used in a mixture with protective colloids. Examples of these are one or more protective colloids from the group consisting of partially hydrolyzed polyvinyl acetates, polyvinylpyrrolidones, carboxymethyl-cellulose, methyl-, hydroxyethyl-cellulose and hydroxypropyl-cellulose, starches, proteins, poly(meth)acrylic acid, poly(meth)acrylamide, polyvinylsulfonic acids, melamine-formaldehyde sulfonates, naphthalene-formaldehyde sulfonates, styrene-maleic acid copolymers and vinyl ether-maleic acid copolymers. If protective colloids are used, they are preferably used in an amount of 0.01 to 1.0% by weight, based on the overall amount of the monomers.

Preferably, part of the make-up water is included in the initial charge and the remainder is metered in, it being possible for the metered addition to take place as part of the initiator feed and of the emulsifier feed. The initial charge of water is calculated such that the proportion of emulsifier in the initial charge is from 0.001 to 0.5% by weight, based on the proportion of water included in the initial charge. If protective colloids are used, they can be included in the initial charge prior to the beginning of polymerization or can be metered in.

The monomers are preferably included in the initial charge in a proportion of from 1 to 10% by weight and the remainder is metered in after the polymerization has been initiated. The proportion of monomers from the group of polar ionic or polar nonionic comonomers is preferably not more than 5% by weight, based on the overall weight of the monomers included in the initial charge.

For initiating the polymerization, some of the initiator can be included in the initial charge and some can be fed in, or all of the initiator can be fed in. Preferably, the polymerization is commenced by heating the mixture to polymerization temperature and metering in the initiator, preferably in aqueous solution. The emulsifier and monomers can be fed in as a mixture but are preferably fed in separately.

When polymerization is at an end, postpolymerization can be carried out using known methods in order to remove residual monomer; for example, by means of postpolymerization initiated with redox catalyst. Volatile residual monomers can also be removed by means of distillation, preferably under reduced pressure, with or without inert entraining gases such as air, nitrogen or steam being passed through or over the mixture.

The aqueous dispersions obtainable with the process have a solids content of from 40 to 75% by weight, preferably from 65 to 75% by weight.

With the procedure according to the invention it is possible to obtain polymer dispersions which have high cohesion values (FINAT Test No. 8: more than 40 min at 23° C./2 kp) and a low peel strength which is stable to aging (FINAT Test No. 1: less than 15 N/2.5 cm after 7 days at 70° C.) and so are outstandingly suitable for producing removable pressure-sensitive adhesive films. As the investigations below indicate, it was possible to prepare dispersions for pressure-sensitive adhesive use which can be detached again virtually without residue and which possess high cohesion values. For use as pressure-sensitive adhesives, the polymer dispersions can be modified with the additives customary for the purpose. Examples of such additives are fillers, pigments, plasticizers and resins. The dispersion of pressure-sensitive adhesive is generally applied to backing materials and used in the form of self-adhesive materials such as labels, adhesive tapes or adhesive sheets. Suitable backing materials are paper or polymer sheets. Application takes place in a known manner in coating units, the dispersion being applied to the backing using, for example, a coating bar and then dried in a drying tunnel.

The pressure-sensitive adhesive dispersions are particularly suitable for producing labels, adhesive tapes and adhesive sheets.

Preparation of the pressure-sensitive adhesive dispersions:

EXAMPLE 1

A 3-liter three-necked flask equipped with a reflux condenser and anchor stirrer was charged with 325.3 g of deionized water, 5.7 g of a dialkyl sulfosuccinate as a 20% strength aqueous solution (AEROSOL MA from CYTEC), 0.48 g of an isotridecyl ethoxylate having 15 EO units as a 40% strength aqueous solution (GENAPOL X-150), 2.9 g of acrylamide as a 30% strength aqueous solution, 1.9 g of potassium peroxodisulfate and 74 g of the monomer mixture of feedstream 1 and this initial charge was heated to 75° C. under nitrogen and with stirring (rotary speed 150 rpm). After the temperature of 75° C. had been established, polymerization was conducted for about 25 minutes. Subsequently, metering in (feedstreams 1, 2 and 3) was begun. The metering times were 4 hours for feedstreams 1 and 2 and 4.5 hours for feedstream 3.

Feedstream 1 (monomer mixture):
  1350 g of butyl acrylate and 92.9 g of methyl methacrylate;

Feedstream 2 (emulsifier mixture):
  84.8 g of water, 26.1 g of acrylamide (30% strength), 123.0 g of Aerosol MA (20% strength), 10.3 g of Genapol X-150 (40% strength);

Feedstream 3 (initiator solution):
  93.9 g of water and 2.9 g of potassium peroxodisulfate.

Following the metered additions, postpolymerization was conducted at 75° C. for about 2 hours. After cooling, the pH was adjusted to 4.5 using ammonia solution. The resulting dispersion was virtually free of gel specks according to microscopic analyses and had a solids content of 70% by weight and a Brookfield viscosity of 3260 mPas at 20 rpm.

COMPARATIVE EXAMPLE 2

A 3-liter three-necked flask equipped with a reflux condenser and anchor stirrer was charged with 234.3 g of deionized water, 0.55 g (20% strength) of AEROSOL MA, 0.05 g (40% strength) of GENAPOL X-150 and 9 g of the monomer mixture of feedstream 1 and this initial charge was heated to 85° C. under nitrogen and with stirring (rotary speed 150 rpm). After the temperature of 85° C. had been established, the initiator solution (2.5 g of potassium peroxodisulfate and 80.4 g of water) was added and polymerization was conducted for about 15 minutes. Subsequently, fed in (feedstreams 1, 2 and 3) was begun. The metering times were 3 hours for feedstreams 1 and 2 and 3.5 hours for feedstream 3.

Feedstream 1 (monomer mixture):
  796.6 g of butyl acrylate and 121.8 g of methyl methacrylate, 18.8 g of acrylic acid;

Feedstream 2 (emulsifier mixture):
  250.2 g of water, 60.4 g of Aerosol MA (20% strength), 5.1 g of Genapol X-150 (40% strength);

Feedstream 3 (initiator solution):
  80.4 g of water and 2.5 g of potassium peroxodisulfate;

Following the metered additions, postpolymerization was conducted at 85° C. for about 2 hours. After cooling, the pH was adjusted to 4.5 using ammonia solution. The resulting dispersion was virtually free of gel specks according to microscopic analyses and had a solids content of 60% by weight and a Brookfield viscosity of 147 mPas at 20 rpm.

COMPARATIVE EXAMPLE 3

A 3-liter three-necked flask equipped with a reflux condenser and anchor stirrer was charged with 232.9 g of deionized water, 0.6 g of AEROSOL MA (20% strength), 0.05 g of GENAPOL X-150 (40% strength) and 9 g of the monomer mixture of feedstream 1 and this initial charge was heated to 85° C. under nitrogen and with stirring (rotary speed 150 rpm). After the temperature of 85° C. had been established, the initiator solution (2.7 g of potassium peroxodisulfate and 70.9 g of water) was added and polymerization was conducted for about 15 minutes. Subsequently, metering in (feedstreams 1, 2 and 3) was begun. The metering times were 3 hours for feedstreams 1 and 2 and 3.5 hours for feedstream 3.

Feedstream 1 (monomer mixture):
  972.0 g of butyl acrylate and 40.5 g of methyl methacrylate, 18.7 g of acrylic acid;

Feedstream 2 (emulsifier mixture):
  163.2 g of water, 65.2 g of Aerosol MA (20% strength), 5.5 g of Genapol X-150 (40% strength);

Feedstream 3 (initiator solution):
  70.9 g of water and 2.7 g of potassium peroxodisulfate;

Following the metered additions, postpolymerization was conducted at 85° C. for about 2 hours. After cooling, the pH was adjusted to 4.5 using ammonia solution. The resulting dispersion was virtually free of gel specks according to microscopic analyses and had a solids content of 65% by weight and a Brookfield viscosity of 3130 mPas at 20 rpm.

EXAMPLE 4

A 3-liter three-necked flask equipped with a reflux condenser and anchor stirrer was charged with 312.7 g of deionized water, 2.7 g of AEROSOL MA (20% strength), 0.2 g of GENAPOL X- 150 (40% strength), 1.7 g of acrylamide (30% strength), and 71 g of monomer mixture of feedstream 1 and this initial charge was heated to 80° C. under nitrogen and with stirring (rotary speed 150 rpm). After the temperature of 80° C. had been established, the initiator solution (2.9 g of potassium peroxodisulfate and 63.7 g of water) was added and polymerization was conducted for about 25 minutes. Subsequently, metering in (feedstreams 1, 2 and 3) was begun. The metering times were 4 hours for feedstreams 1 and 2 and 4.5 hours for feedstream 3.

Feedstream 1 (monomer mixture):
    955.7 g of butyl acrylate and 43.4 g of methyl methacrylate, 65.2 g of ethylhexyl acrylate, 0.5 g of dodecyl mercaptan;

Feedstream 2 (emulsifier mixture):
    0.2 g of water, 90.1 g of Aerosol MA (20% strength), 7.7 g of Genapol X-150 (40% strength), 16.3 g of methacrylamide, 16.4 g of acrylamide (30% strength);

Feedstream 3 (initiator solution):
    63.7 g of water and 2.9 g of potassium peroxodisulfate;
    Following the metered additions, postpolymerization was conducted at 80° C. for about 2 hours. After cooling, the pH was adjusted to 4.5 using ammonia solution. The resulting dispersion was virtually free of gel specks according to microscopic analyses and had a solids content of 70% by weight and a Brookfield viscosity of 940 mPas at 20 rpm.

EXAMPLE 5

A 3-liter three-necked flask equipped with a reflux condenser and anchor stirrer was charged with 232.5 g of deionized water, 0.8 g of AEROSOL MA (20% strength), 0.07 g of GENAPOL X-150 (40% strength) and 11 g of monomer mixture of feedstream 1 and this initial charge was heated to 75° C. under nitrogen and with stirring (rotary speed 150 rpm). After the temperature of 75° C. had been established, the initiator solution (0.7 g of potassium peroxodisulfate and 14.2 g of water) was added and polymerization was conducted for about 15 minutes. Subsequently, metering in (feedstreams 1, 2 and 3) was begun. The metering times were 3 hours for feedstreams 1 and 2 and 3.5 hours for feedstream 3.

Feedstream 1 (monomer mixture):
    889.6 g of butyl acrylate and 40.4 g of methyl methacrylate, 60.7 g of ethyl acrylate, 10.1 g of hydroxyethyl acrylate;

Feedstream 2 (emulsifier mixture):
    118.0 g of water, 85.7 g of Aerosol MA (20% strength), 7.3 g of Genapol X-150 (40% strength), 33.7 g of acrylamide;

Feedstream 3 (initiator solution):
    86.7 g of water and 2.7 g of potassium peroxodisulfate;
    Following the metered additions, postpolymerization was conducted at 85° C. for about 2 hours. After cooling, the pH was adjusted to 4.5 using ammonia solution. The resulting dispersion was virtually free of gel specks according to microscopic analyses and had a solids content of 65% by weight and a Brookfield viscosity of 1280 mPas at 20 rpm.

COMPARATIVE EXAMPLE 6

A 3-liter three-necked flask equipped with a reflux condenser and anchor stirrer was charged with 232.4 g of deionized water, 0.78 g of AEROSOL MA (20% strength), 0.07 g of GENAPOL X-150 (40% strength) and 11 g of monomer mixture of feedstream 1 and this initial charge was heated to 75° C. under nitrogen and with stirring (rotary speed 150 rpm). After the temperature of 75° C. had been established, the initiator solution (0.7 g of potassium peroxodisulfate and 14.2 g of water) was added and polymerization was conducted for about 15 minutes. Subsequently, metering in (feedstreams 1, 2 and 3) was begun. The metering times were 3 hours for feedstreams 1 and 2 and 3.5 hours for feedstream 3.

Feedstream 1 (monomer mixture):
    879.1 g of butyl acrylate, 40.4 g of methyl methacrylate, 60.3 g of ethyl acrylate, 20.2 g of hydroxyethyl acrylate, 0.5 g of dodecyl mercaptan;

Feedstream 2 (emulsifier mixture):
    118.2 g of water, 85.6 g of Aerosol MA (20% strength), 7.3 g of Genapol X-150 (40% strength), 33.7 g of acrylamide (30% strength);

Feedstream 3 (initiator solution):
    86.7 g of water and 2.7 g of potassium peroxodisulfate;
    Following the metered additions, postpolymerization was conducted at 85° C. for about 2 hours. After cooling, the pH was adjusted to 4.5 using ammonia solution. The resulting dispersion was virtually free of gel specks according to microscopic analyses and had a solids content of 65% by weight and a Brookfield viscosity of 2830 mPas at 20 rpm.

EXAMPLE 7

A 3-liter three-necked flask equipped with a reflux condenser and anchor stirrer was charged with 231.6 g of deionized water, 0.8 g of AEROSOL MA (20% strength), 0.07 g of GENAPOL X-150 (40% strength) and 11 g of monomer mixture of feedstream 1 and this initial charge was heated to 75° C. under nitrogen and with stirring (rotary speed 150 rpm). After the temperature of 75° C. had been established, the initiator solution (0.65 g of potassium peroxodisulfate and 14.2 g of water) was added and polymerization was conducted for about 15 minutes. Subsequently, metering in (feedstreams 1, 2 and 3) was begun. The metering times were 3 hours for feedstreams 1 and 2 and 3.5 hours for feedstream 3.

Feedstream 1 (monomer mixture):
    825.7 g of butyl acrylate and 40.3 g of methyl methacrylate, 60.4 g of ethyl acrylate, 20.2 g of hydroxyethyl acrylate, 0.2 g of dodecyl mercaptan, 60.41 g of VeoVa 10;

Feedstream 2 (emulsifier mixture):
    126.1 g of water, 85.1 g of Aerosol MA (20% strength), 7.2 g of Genapol X-150 (40% strength), 33.6 g of acrylamide (30% strength);

Feedstream 3 (initiator solution):
    86.4 g of water and 2.7 g of potassium peroxodisulfate;
    Following the metered additions, postpolymerization was conducted at 85° C. for about 2 hours. After cooling, the pH was adjusted to 4.5 using ammonia solution. The resulting dispersion was virtually free of gel specks according to microscopic analyses and had a solids content of 65% by weight and a Brookfield viscosity of 1020 mPas at 20 rpm.

EXAMPLE 8

A 3-liter three-necked flask equipped with a reflux condenser and anchor stirrer was charged with 232.5 g of deionized water, 0.55 g of AEROSOL MA (20% strength), 0.05 g of GENAPOL X-150 (40% strength) and 9 g of monomer mixture of feedstream 1 and this initial charge was heated to 75° C. under nitrogen and with stirring (rotary speed 150 rpm). After the temperature of 75° C. had been established, the initiator solution (0.6 g of potassium peroxodisulfate and 19.5 g of water) was added and polymerization was conducted for about 15 minutes. Subsequently, metering in (feedstreams 1, 2 and 3) was begun. The metering times were 3 hours for feedstreams 1 and 2 and 3.5 hours for feedstream 3.

Feedstream 1 (monomer mixture):
  878.8 g of butyl acrylate and 18.6 g of methyl methacrylate, 9.3 g of acrylic acid, 1.9 g of ethylhexyl acrylate;

Feedstream 2 (emulsifier mixture):
  234.4 g of water, 59.9 g of Aerosol MA (20% strength), 5.1 g of Genapol X-150 (40% strength);

Feedstream 3 (initiator solution):
  79.8 g of water and 2.5 g of potassium peroxodisulfate;

Following the metered additions, postpolymerization was conducted at 85° C. for about 2 hours. After cooling, the pH was adjusted to 4.5 using ammonia solution. The resulting dispersion was virtually free of gel specks according to microscopic analyses and had a solids content of 59.5% by weight and a Brookfield viscosity of 248 mPas at 20 rpm.

TEST METHODS

Peel Strength (bond strength):

For the measurements, the tested adhesive dispersions were drawn down using a coating bar onto the backing (sodium kraft paper) in a thickness such that drying left a uniform polymer film of from 24 to 26 g/m$^2$. The peel strengths were measured in accordance with the FINAT Test Method No. 1 (FINAT Technical Handbook, 4th edition 1995). Test strips with a width of 25 mm were bonded onto a glass plate and fastened in a tensile tester so that the strip had a peel angle of 180°, and the test strip was peeled off at a rate of 300 mm/min. The peel values were measured after a bonding time of 8 minutes at room temperature (23° C. and 50% relative atmospheric humidity) and at 70° C. after 7 days, in order to simulate the aging or increase of peel values after a prolonged bonding time.

Resistance to Shear (cohesion):

For the measurements, the tested adhesive dispersions were drawn down using a coating bar onto the backing (sodium kraft paper) in a thickness such that drying left a uniform polymer film of from 24 to 26 g/m$^2$. The bond strengths were measured in accordance with the FINAT Test Method No. 8 (FINAT Technical Handbook, 4th edition 1995). The backing material coated with pressure-sensitive adhesive, in the form of a strip with a width of 25 mm, was bonded to a glass plate such that a test area of 25 mm×25 mm was in contact with the glass plate. The free end of the adhesive strip was loaded with a weight and the time taken for the strip to shear off from the test plate was measured. In our measurements, the loading weight was 2 kg.

The test results are compiled in Table 1.

Pressure-sensitive adhesives without polar comonomers (Comp. Ex. 3) do have low peel strength (good aging behavior) even after 7 days storage at 70° C., but the cohesion values are unsatisfactory. The presence of 2% of polar ionic comonomer (Comp. Ex. 2) does make it possible to increase the cohesion, but at the same time the peel values increase greatly on aging. The optimum combination of properties—high cohesion and low, aging-resistant peel values—are obtained with Examples 1, 4, 5, 7 and 8. With polar nonionic comonomers as well, an excessive content (Comp. Ex. 6) results in unsatisfactory aging behavior of the adhesive film.

TABLE 1

| Example | Polar monomers based on Total monomer | [% by wt.] | Cohesion [min.] 23° C./2 kp | Cohesion [min.] 50° C./1 kp | Peel strength [N/2.5 cm] 8 minutes' bonding time at 23° C. | | Peel strength [N/2.5 cm] 7 days' bonding time at 70° C. |
|---|---|---|---|---|---|---|---|
| Example 1 | Acrylamide | 0.6 | 115 | 145 | Glass | 6.3 | 9.6 |
| | | | | | Steel | 6.3 | 9.9 |
| Comp. Ex. 2 | Acrylic acid | 2.0 | 348 | >5000 | Glass | 8.6 | 22 |
| | | | | | Steel | 7.6 | 21 |
| Comp. Ex. 3 | None | | 7.1 | 6.3 | Glass | 8.8 | 9.9 |
| | | | | | Steel | 8.6 | 11 |
| Example 4 | Methacrylamide | 1.5 | 463 | 1315 | Glass | 7.6 | 8.4 |
| | Acrylamide | 0.5 | | | Steel | 4.1 | 6.4 |
| Example 5 | Hydroxyethyl acrylate | 1.0 | 1555 | >2500 | Glass | 6.8 | 9.1 |
| | Acrylamide | 1.0 | | | Steel | 4.6 | 11 |
| Comp. Ex. 6 | Hydroxyethyl acrylate | 2.0 | 223 | >2500 | Glass | 8.7 | Backing tears |
| | Acrylamide | 1.0 | | | Steel | 5.1 | Backing tears |
| Example 7 | Methacrylamide | 1.0 | 935 | >2870 | Glass | 6.0 | 7.7 |
| | Acrylamide | 1.0 | | | Steel | 5.9 | 9.3 |
| Example 8 | Acrylic acid | 1.0 | 80 | 162 | Glass | 6.6 | 7.6 |
| | | | | | Steel | 7.6 | 8.1 |

What is claimed is:

1. A process for the preparation of an aqueous non-crosslinked polymer dispersion suitable for preparing single layer redatachable pressure sensitive adhesive films, said process comprising:
   copolymerizing by free radical-initiated emulsion polymerization monomer(s) comprising at least one
   a) mono-ethylenically unsaturated monomer selected from the group consisting of (meth)acrylic acid esters of $C_{1-12}$ branched or unbranched alcohols, vinyl esters of $C_{1-12}$ branched or unbranched carboxylic acids, vinyl aromatics, vinyl halides, and olefins, and b) from 0.01 to 2.0 weight percent, based on the weights of a) and b) of polar comonomers, said polar comonomers selected from the group consisting of polar, non-ionic comonomers and polar, ionic monomers, wherein when polar, ionic monomers are present, they are present in an amount not more than 1.0 weight percent based on the weights of a) and b).

2. The process of claim 1, wherein (meth)acrylic acid esters of $C_{1-12}$ branched or unbranched alcohols are employed, and comprise 50 weight percent or more of the weights of a) and b).

3. The process of claim 1, wherein said monomer(s) a) include at least one of ethyl acrylate, n-butyl acrylate, 2-ethylhexyl acrylate; a mixture of methyl methacrylate with at least one of n-butyl acrylate and 2-ethylhexyl acrylate; a mixture of methyl methacrylate with at least one of n-butyl acrylate and ethyl acrylate; a mixture of styrene with at least one of ethyl acrylate and n-butyl acrylate; a mixture of ethylene, at least one acrylic ester selected from the group consisting of ethyl acrylate, n-butyl acrylate, 2-ethylhexyl acrylate, and at least one vinyl ester selected from the group consisting of vinyl acetate and vinyl esters of α-branched monocarboxylic acids having 9 to 11 carbon atoms.

4. The process as claimed in claim 1, wherein the weight fractions of monomers a) and comonomers b) are selected so as to provide a polymer with a glass transition temperature Tg of from −60° C. to 0° C.

5. The process as claimed in claim 1, wherein the polar, ionic comonomers comprise at least one member selected from the group consisting of ethylenically unsaturated mono- and dicarboxylic acids and ethylenically unsaturated sulfonic acids; and the polar, nonionic comonomers comprise at least one member selected from the group consisting of ethylenically unsaturated carboxamides, methacrylic acid hydroxyalkyl esters and acrylic acid hydroxyalkyl esters.

6. The process as claimed in claim 1, wherein the polar, ionic comonomers comprise at least one member selected from the group consisting of acrylic acid and methacrylic acid; and the polar, nonionic comonomers comprise at least one member selected from the group consisting of acrylamide, methacrylamide, hydroxyethyl acrylate, hydroxypropyl acrylate and hydroxybutyl acrylate.

7. The process as claimed in claim 1, wherein the proportion of polar, ionic comonomers is from 0.2 to 0.99% by weight; and the proportion of polar nonionic comonomers is from 0.5 to 2.0% by weight, the proportions in percent by weight being based in each case on the overall weight of monomers a) and comonomers b).

8. The process of claim 1 wherein both polar, non-ionic comonomers b) and polar, ionic comonomers b) are present.

9. The process of claim 1, wherein the monomer a) consist essentially of one of the following monomer mixtures:
butyl acrylate and methylmethacrylate;
butyl acrylate, methylmethacrylate, and ethylhexylacrylate; or
butyl acrylate, methylmethacrylate, and ethylacrylate.

10. A pressure sensitive adhesive comprising an aqueous polymer dispersion prepared by the process of the claim 1.

11. A pressure sensitive adhesive-bearing substrate bearing as a single layer of pressure sensitive adhesive a film of the polymer dispersion prepared by the process of claim 1.

12. A pressure sensitive adhesive-bearing substrate bearing as a single layer of pressure sensitive adhesive a film of the polymer dispersion prepared by the process of claim 2.

13. A pressure sensitive adhesive-bearing substrate bearing as a single layer of pressure sensitive adhesive a film of the polymer dispersion prepared by the process of claim 3.

14. A pressure sensitive adhesive-bearing substrate bearing as a single layer of pressure sensitive adhesive a film of the polymer dispersion prepared by the process of claim 4.

15. A pressure sensitive adhesive-bearing substrate bearing as a single layer of pressure sensitive adhesive a film of the polymer dispersion prepared by the process of claim 5.

16. A pressure sensitive adhesive-bearing substrate bearing as a single layer of pressure sensitive adhesive a film of the polymer dispersion prepared by the process of claim 6.

17. A pressure sensitive adhesive-bearing substrate bearing as a single layer of pressure sensitive adhesive a film of the polymer dispersion prepared by the process of claim 7.

18. A process for the manufacture of a pressure sensitive adhesive-bearing substrate, said process comprising coating said substrate with a polymer dispersion prepared by the process of claim 1 and drying said polymer dispersion to a tacky film.

19. The process of claim 14, wherein said pressure sensitive adhesive-bearing substrate comprises a label, an adhesive tape, or an adhesive sheet.

20. A process for the manufacture of a pressure sensitive adhesive-bearing substrate, said process comprising coating said substrate with a polymer dispersion prepared by the process of claim 7 and drying said polymer dispersion to a tacky film.

* * * * *